United States Patent
Abel, Jr.

[15] 3,693,535
[45] Sept. 26, 1972

[54] POUR-IN, INSTANT BREWING ELECTRIC COFFEE MAKER

[72] Inventor: Edmund A. Abel, Jr., 345 South Island Dr., Rocky River, Ohio 44116

[22] Filed: July 26, 1971

[21] Appl. No.: 166,104

[52] U.S. Cl. ..................99/282, 99/285, 99/288, 99/305, 219/297, 219/314
[51] Int. Cl. ..........................................A47j 31/057
[58] Field of Search........99/280, 281, 282, 283, 295, 99/299, 285, 300, 304, 305; 219/314, 297

[56] References Cited

UNITED STATES PATENTS

| | | |
|---|---|---|
| 2,725,008 | 11/1955 | Okie.....................219/314 |
| 2,926,234 | 2/1960 | Palmer...................99/281 |
| 3,347,151 | 10/1967 | Ronalds..................99/281 |
| 3,450,024 | 6/1969 | Martin...................99/295 |
| 3,605,604 | 9/1971 | Diebolb..................99/281 |

Primary Examiner—Robert W. Jenkins
Attorney—Philip D. Golrick et al.

[57] ABSTRACT

In a pour-in, instant brewing type-coffee maker, gravity flow of water, from a receiving tray bottom orifice to an electric resistance heated block of a unit heating the water as it passes to a brewing funnel discharging hot brewed coffee, is controlled by a float-varied orifice structure, and the tray overlies the block for tray water heating by water vapor latent heat; thus eliminating need of a large block mass or excessive heater wattage to provide requisite hot water temperature in an acceptable cycle time, and permitting a simple molded plastic housing design. Baffling in a block water flow top cavity conduces to efficient heat transfer and to reduction of steaming and of attendant noise.

21 Claims, 7 Drawing Figures

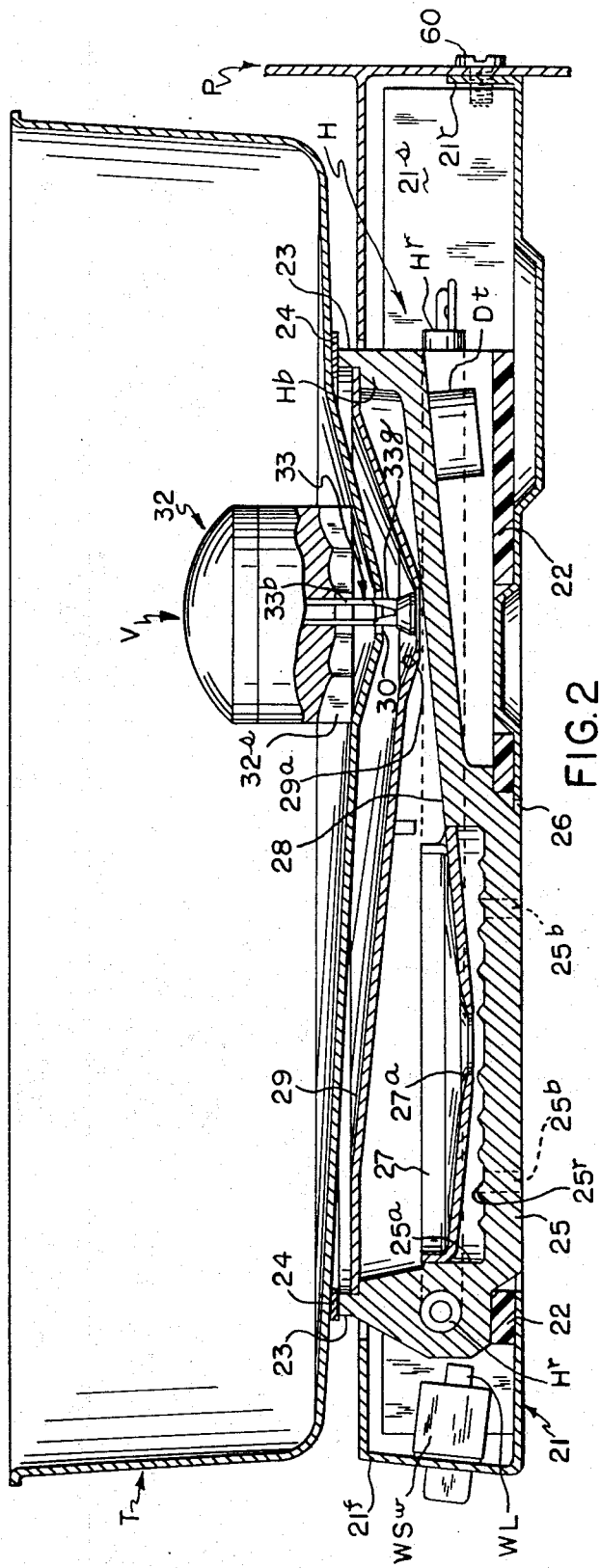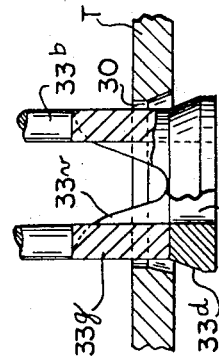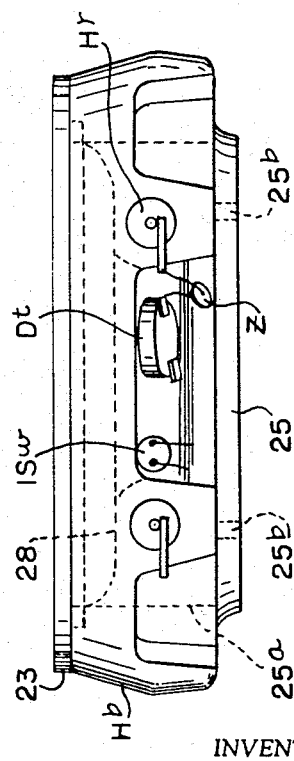

INVENTOR.
EDMUND A. ABEL JR.
BY
*Ely, Golrick & Flynn*
ATTORNEYS

POUR-IN, INSTANT BREWING ELECTRIC COFFEE MAKER

The present invention relates generally to pour-in type electrical water heating apparatus, more particularly to so-called instant heat, pour-in electrical water heating apparatus. However, because of particular utility for hot beverage making purposes, the invention will be described in terms of and embodied in a so-called electric coffee maker; but it is to be understood that certain major features of the hereinafter disclosed embodiment of the invention have broader utility and application.

For coffee brewing and like hot beverage making purposes, in situations where a water supply connection required for an automatic machine is inconvenient or is unavailable, particular application has been found for the so-called "pour-in" type machine, since pouring in a selected volume of cold water results in delivery of an equal volume of hot water at an appropriate temperature and rate to a brewing or extracting funnel in turn discharging a corresponding quantity of prepared hot coffee to a receiver beaker. In so-called instant heating machines, from a pour receiving tray or reservoir of capacity sufficient to immediately receive the desired maximum pour-in volume, cold water passes through an electric heating device to be heated as it is flowing to a point of use.

In the now more commonly used pour-in instant heating type, with which the present invention is particularly concerned, water flows by gravity through a metering tray outlet orifice, over and through a thermostatically controlled electrical resistance heated metal block, and thence through a coffee brewing or extraction funnel to a receiving vessel, or where merely hot water is desired, directly to a receiving vessel. Because with the usual fixed tray outlet orifice the rate of flow continuingly decreases from an initial maximum rate with the decreasing water level, in order to keep the wattage of the electrical heating element at a level acceptable for general appliance use, while at the same time avoiding too long a cycle time for say a desired eight or twelve cup maximum delivery at the desired temperature, it has been a common practice to use in the heating device a metal block, usually a casting of rather large mass, therefore large heat capacity, as a heat reservoir pre-heated to a pre-set temperature before the water delivery is begun. Moreover, to accommodate control elements involved in obtaining a better thermostat response desired, at times more complex castings have been required in the heating unit block.

Such prior art pour-in instant heaters entail certain undesirable features or disadvantages. Thus with the pre-heated heat reservoir, the comparatively large heater block mass represents added cost in the metal itself and in fabrication of the casting, and further in the size and strength of housing or support structures required. At times undue complexity of casting contour has been required to obtain the desired heat transfer from the heating resistance element to the water. Moreover, the volume of the metal block has prevented a desired compactness of the machine. Also in many cases there is excessive visible steaming, at times with objectionable attendant noise or heat loss. To some degree, the block pre-heat time at least on an initial cycle of use may add undesirably to the cycle time.

By the present invention, first the gravity feed of water from the reservoir to the heater device is controlled by means appropriately varying the reservoir bottom orifice so the program or control the flow as to utilize the resistance heating ability more effectively throughout the cycle; and the reservoir is superimposed upon and as a cover for a heating block having a top water flow cavity having certain baffling therein.

By this arrangement, hereinafter described in one detailed embodiment, need for a large mass of metal as a heat reservoir is eliminated, while yet a satisfactorily short time cycle is attained for the rated volume capacity of the equipment with an acceptable heater wattage; and comparatively simple thermal controls may be used. In great part, heat otherwise wasted through steaming in comparable prior art machines is transferred to water in the reservoir before delivery to the heater block, increasing efficiency of the apparatus and diminishing external steaming; while the baffling also aids abating a hissing or frying noise often present to some degree in apparatus of this type.

Along with effective heat transfer, relative simplicity and small size in the heating element casting is attained, decreasing the component and fabrication costs as well as enabling use of a smaller simpler lower cost housing structure.

It is the general object of the present invention to provide, for a coffee brewer or like water heating apparatus, an improved form of pour-in instant heating structure.

Another object is the provision of apparatus of the type described wherein there is used a heating device of comparatively small mass for the purposes required.

Another object is to provide, in apparatus of the type described, means varying or programming gravity flow of water to and through an electrical direct heating unit during an operating cycle.

Another object is to provide, in apparatus of the type described, a gravity water feed flow control orifice varying in effective size so that a heating block of a given wattage will deliver hot water of an appropriate or desired temperature range in an acceptable flow time.

A still further object is the provision of a pour-in, instant heating system in apparatus of the type described which enables use of a housing construction adapted to comparatively low cost fabrication, by modern plastic molding techniques.

Other objects and advantages will appear from the following description of a particular embodiment and the drawings wherein:

FIG. 2 is a enlarged vertical section taken generally centrally and longitudinally through the heating unit, the bottom of the water reservoir tray, and an orifice valving system;

FIG. 3 is a back end view of the heating unit;

FIG. 4 is an enlarged detail of the variable orifice arrangement;

GENERAL ARRANGEMENT

Figure 1:
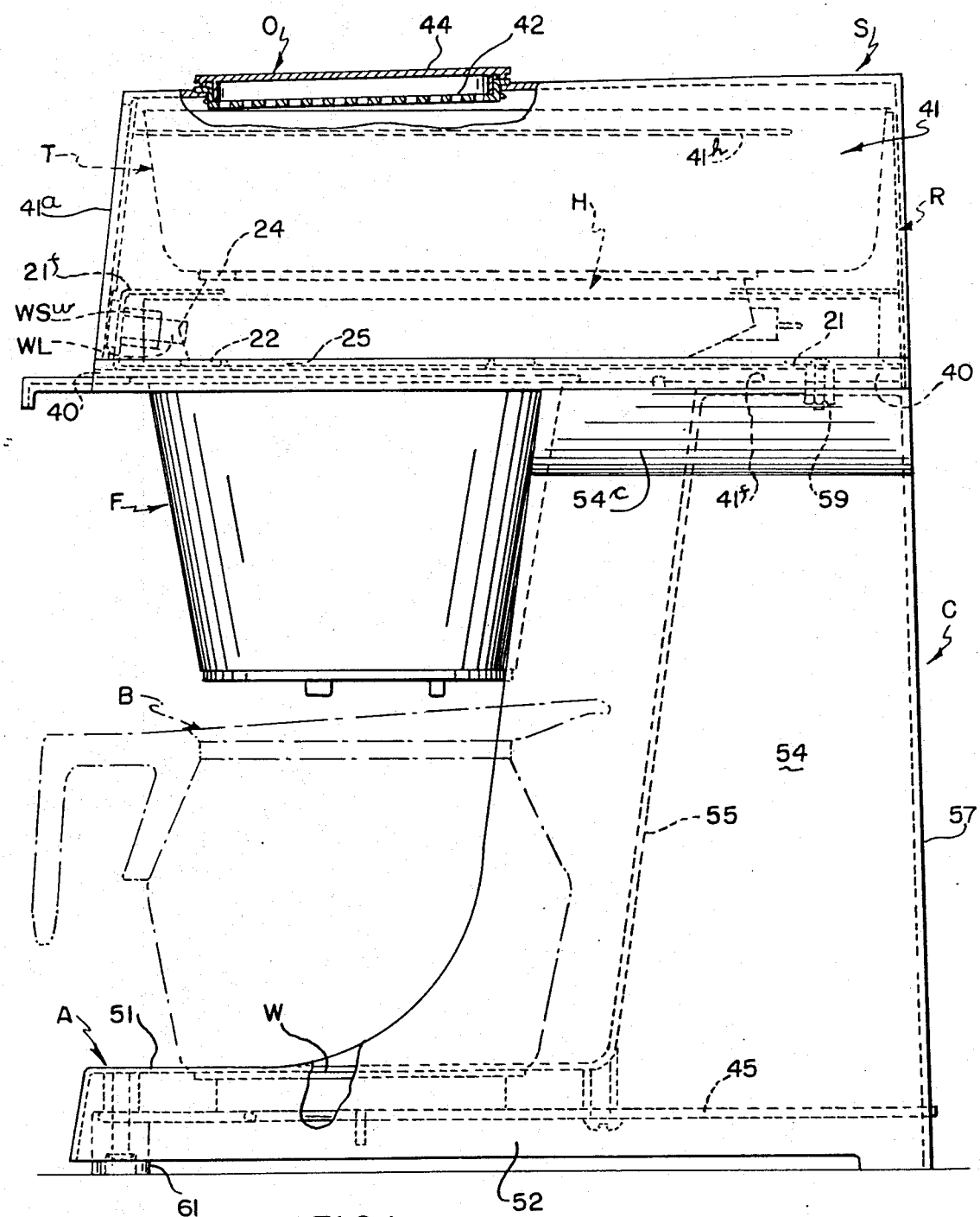
FIG. 1 is a side elevational view of a coffee brewing machine embodying the present invention, with certain parts broken away for clarity of representation.
Figure 5:
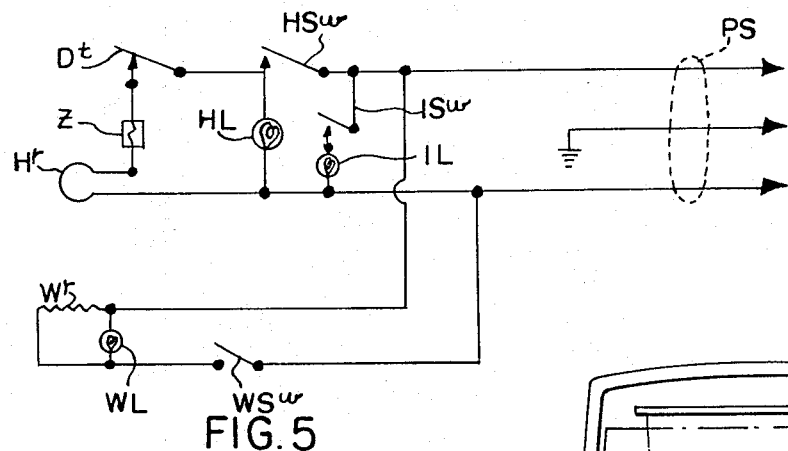
FIG. 5 is a schematic electrical diagram for the apparatus.

The particular embodiment of the present invention appearing in the drawings (see FIGS. 1 and 2) comprises, as principal components, a housing structure including a pedestal element providing integrally an extended horizontal base portion A with a vertically extended back column portion C, and supported on the pedestal, a top shell or hood element S; in the base, a warmer plate W for a product coffee receiving beaker B, above which a brewing funnel F is slideably, insertably and removably supported in the bottom of an over-hanging front part of the hood S; and within the hood, a generally rectangular pour-in reservoir tray T, the major part of appropriate electrical wiring for control elements, as represented by schematic FIG. 5, and an electrical resistance type water heater unit H, to discharge hot water downwardly into funnel F. The tray T, perferrably a drawn sheet metal structure, say of aluminum, has a capacity to receive a desired or rated maximum of water poured in through the hood top opening structure O; and its bottom has an elongated central depression symmetrically sloped from the sides to a discharge bottom orifice 30 rearwardly offset on the longitudinal center line and provided with a variable orifice or valving structure V (see FIG. 4) controlling water gravity feed to the heater unit as hereinafter described.

HEATING SYSTEM SECTION

The structural and functional relations of the tray T, the heating unit H and associated co-operating parts are best seen from the enlarged detail of FIG. 2.

The unit H comprises a contoured metal body or block Hb, symmetrical about a longitudinal center-line, preferably cast of aluminum as hereinafter described in generally elongated oval shape about a formed resistance rod type heating element Hr; and is supported on a formed sheet metal support or hood bottom plate 21, with an interposed sealing and insulating flat Silicone composition bottom gasket 22.

In the top of block Hb, a broad flow recess or cavity, including a front circular well 25a and a sloping channel 28, is circumscribed by a rim bead 23 upon which, through an interposed flat oval Silicone top gasket 24, the reservoir tray T is supported. At the left as seen in FIG. 2, under well 25a, disk-like beveled downward offset or flat boss 25 projecting into a corresponding large bottom plate opening 26, is penetrated by four equi-spaced block cavity discharge openings 25b. A circumferentially upwardly rim-flanged circular well baffle plate 27, dished to an edge-beveled central opening 27a, is press-fitted to a close spaced relation with an array of interrupted spaced concentric ridges 25r integrally cast in the bottom of the well, for increased heat transfer area and flow baffling.

A further drawn sheet metal elongated oval baffle plate 29, inserted cover-like in the broad top region of the casting cavity within rim 23, is inwardly depressed from its flat rim margins symmetrically towards the longitudinal center-line and further along that line towards a circular opening 29a centrally disposed beneath the tray outlet orifice 30 to direct water to the upper end region of the sloping channel 28 leading downwardly to the well edge to discharge through a flange interruption to the top of the baffle 27 and into the well. As appears from FIG. 2, the similarly convergent bottom of the tray T serves not only to direct contained water towards its discharge orifice 30 centered above the opening 29a but also on its sloping under surface guides steam condensate to the region of the orifice, to feed water to the sloping channel 28. Thus water runs with continual opportunity for heat transfer beneath 29, along channel 28 onto the baffle disk 27, through central opening 27a to flow from the center across the corrugated or ribbed bottom well surface to apertures 25b at the outer well margin to discharge downwardly into brew funnel F.

The cast-in heating resistor rod Hr in one end of the block is formed into a nearly circular shape to surround the major circumference of the central well region (with spacing as shown at the left of FIG. 2) from which its ends are carried in the casting out to the right parallel and adjacent the flow channel 28.

A disk type thermal switch or thermostat Dt is secured in good thermal contact on the heater block casting in a bottom recess below the water entrance region of the channel 28, there comparatively thin-walled so that the switch quickly responds to turn on when water begins impinging upon the heater casting (see also FIG. 3). Adjacently there is located a thermal limiting element or heat fuse Z electrically connected (see FIG. 5) between the thermostat disk and one end of the heater element Hr. Similarly there is bolted or otherwise secured on the bottom of the casting the thermal switch ISw for a readiness indicating light herein described.

ELECTRICAL SYSTEM

For the electrical system shown in FIG. 5, switches and associated pilot lamps for the warmer plate W and the heater H, also a "ready" indicator light, are supported for alignment in or with respective apertures at the bottom margin of the hood front face panel 41a by mounting in the front flange 21f of the hood floor plate 21 supporting the unit H and its associated thermally responsive control elements. This electrical system comprises the warmer plate switch WSw and an associated pilot light WL, with warmer plate resistance Wr connected in a warmer circuit branch across the main power leads of a three-wire grounded power supply cord PS; the ready indicating light IL in series across the power leads with the thermally responsive indicator switch ISw secured in good thermal contact on the block of heater unit H; and further across the main leads, in a series circuit, the heating unit resistance Hr, a thermal limiter device or thermal fuse Z, a disk thermostat Dt bolted or secured as described on the heater unit casting, and the heater unit switch HSw, with the pilot light HL of the latter in parallel with Hr, Dt, and Z.

Thus the lamps HL and WL are typically connected to light for the "on" condition of their respective switches; but the indicator lamp IL will be illuminated when and as long as the block is actually at its required starting temperature, say 220F, at which to close thermal switch ISw is appropriately set or chosen.

The reflection or back fold on the upward front edge flange 21f of the support plate 21, also the inward horizontal projection of the insulating plastic T-section housing back cover plate R appropriately cover terminals or other exposed conductive elements of the wiring in all normal use or cleaning of the apparatus.

FLOW CONTROL VALVE V

In the aforementioned orifice valving structure, the principal elements (see FIG. 4) are a float element 32 of a suitable material, e.g., cork or an inert closed cell synthetic plastic foam, such as polyethylene foam, and a central valving element 33 dependent through and vertically shiftable in the orifice 30. The latter is reamed cylindrical at its top, and then conical to the bottom to form a tapered seat for a portion of the valve element 33.

On the bottom of the float 32, centrally recessed and having radial slots 32s to afford free water flow to the orifice when the float bottoms, there is centrally inserted and secured an elongated hairpin-shaped element 33b projecting through the orifice 30 to carry on its bottom end a primary orifice disk or plug 33d having an externally upwardly male tapered surface cooperating with and sealable against the similar female orifice taper to limit tray discharge to the central primary orifice 33c. Forming in effect a short smaller tubular upward extension 38g with 33b projecting upward in a rigid vertical bail, on the plug portion 33d and on opposite sides of 33b there are silver soldered roughly half-cylindrical pieces each notched as at 33v to provide greater flow communication with the orifice 33c, but more especially to afford added lateral flow space when the notch bottoms pass below the cylindrical part of orifice 30 shortly after the plug unseats. This notched tubular extension 38g of the plug disk has a slidable fit with the narrower non-tapered top portion of the orifice 30, here shown about twice the diameter of 33c.

With the bail length appropriately set, the float does not become free floating, that is, does not begin descending with dropping water level, until in the operation cycle the tray water level has dropped so far that it is desired to have a greater flow rate than is permitted through the fixed orifice 33c with the plug 33d seated.

Obviously after the water level has dropped sufficiently to begin free floating, the continuing level drop causes the plug 33d to move downward increasing the flow area available beyond that of 33c, as the notches 33v are increasingly exposed below the opening 30, until the valve is thus fully opened with the float feet defined between the radial slots resting on the tray bottom and preferrably with the plug 33d still clear of the block after a typical travel of say five-sixth inch.

The point in the cycle, in terms of water remaining in the tray, at which the valve opens for increasing the flow may of course be changed by changing the spacing of the float from a given plug 33d, or by changing the depth of the notches 33v, while of course the extent and manner of flow increase may be changed by modifying the notch shape.

Figure 7:
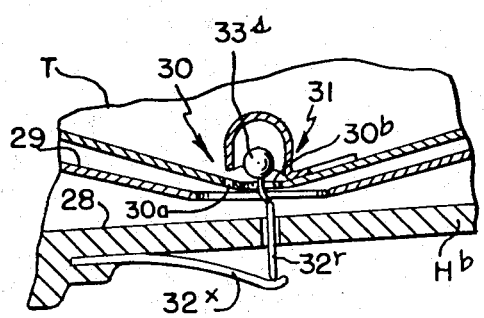
FIG. 7 is a fragmentary generalized representation of a flow control modification.

For simplicity the above described programmed variable orifice structure is preferred to other expedients for varying the flow, such as a thermally responsive bellows supported in the bottom of the tray and by expansion moving a valving element similar to 33 relative to the tray outlet opening; or the valving form shown by the generalized representation of fragmentary FIG. 7 analogous to FIG. 4; or more sophisticated and expensive arrangements, such as electronic or solenoidal means for level sensing and flow area variation.

In FIG. 7, wherein similar reference characters are used for elements analogous to those previously described, the tray has two adjacent bottom outlet openings, a primary or fixed orifice 30a and a controlled or secondary orifice 30b, through which water flow is controlled by a ball valve structure. The latter includes a ball cage or guide 31, a ball 33s carried on the upper end of a support rod 33r projecting through an aperture in the bottom of channel 28, for bottom end engagement with the free end of a bimetal strip actuator 32x anchored with good thermal contact on the bottom of Hb; the rod being shiftably sealed (by means not shown) in the channel wall aperture.

Obviously the flow through the fixed orifice 30a will vary inversely with the water level or head. But after an initial water flow has cooled the channel area from preheat temperature and ball 33s is seated, as the flow through 30a is decreasing with dropping water level, and also the temperature of the tray water is increasing, the consequent tendency of the adjacent block region to increase in temperature causes the actuator to flex upwardly lifting the ball from orifice 30b to increase the water flow. The cage 31 in its flow openings may also be so shaped relative to the ball to achieve progressively greater increase of flow with the ball upward excursion.

HOUSING STRUCTURE

The housing is comprised primarily of molded plastic elements; the pedestal integrally providing the aforementioned base and column portions A,C; and the hood S, provided by a generally rectangular hollow plastic casing 41 molded with an open bottom and open back end, closed respectively by the metal plate 21 and by a T-section back plate R; a snap-in grill or grating element 42 retained in a square molded frontward opening in the flat top panel and in turn covered by an inset lid 44 easily removable for filling at the pour-in opening structure O; and the warmer plate support bracket 45; all being molded plastic accepting bracket 45 and plate 21. Warmer plate W is conventional and clamped on 45.

A rectangular open bottomed pedestal base A is defined by a flat top wall 51 and, dependent therefrom, at the front, back and sides a skirt 52 peripherally continuous about all the four pedestal sides; three bosses being integrally molded in the recessed bottom for screws mounting the roughly triangular formed steel wire bracket 45 at the base opening and also two bumper type feet within the respective front corners. At the back of the pedestal feet are provided by downward local skirt projections near the respective back corners. In the column C, slightly upwardly convergent and tapering side panels 54, with forwardly curving bottom ends merging into the skirt sides, are connected at their front edges by an upwardly backwardly sloping forwardly concave joining portion 55, and at the rear of by what might be considered a downwardly notched back panel 57, sloping slightly forwardly upwardly from a bottom margin constituting the back side portion of the base skirt.

Figure 6:
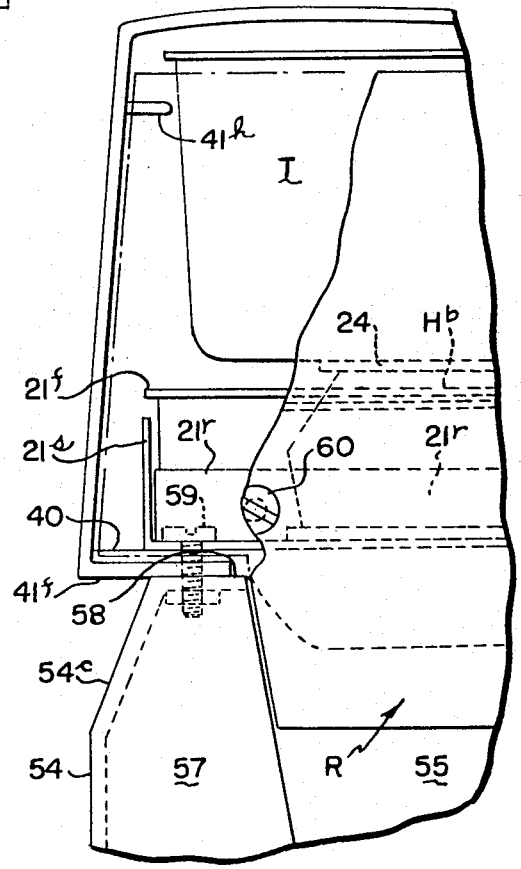
FIG. 6 is a fragmentary back elevational detail.

As seen best in FIG. 6, just short of the top of the column the side panels 54 terminate in inwardly breaking, that is, more sharply convergent, narrow portions 54c from which extend respective coplanar horizontal inward flanges 58 elongated fore and aft to join adjacent top edge portions of the concave front end of the lateral arm portions of the V-notched back panel.

Opposed coplanar inward longitudinal bottom flanges 41f on the casing sides are bonded by adhesive or otherwise, along their back portions to the flanges 58, thereby to secure the hood on the pedestal. Preferably integral aligning pins on 58 are received in corresponding apertures in flanges 41f.

Along the bottom of the forwardly over-hanging part of the hood, the bottom flanges 41f, the lateral margins of plate 21 and interposed spacer strips 40 narrower than flanges 41f, define respective opposed lateral slots to receive slidingly a flat projecting supporting rim lip of the brewing funnel F inserted from the front under the bottom edge of the integral recessed front face panel 41a. The front ends of the strips 40 are rounded or tapered to form a funnel lip guiding slot mouth. (Similarly the rim lip may be received of a simple discharge funnel used when merely hot water is to be discharged).

In the upper region of the casing 41, horizontal longitudinal inward flanges 41h are integrally molded on the sides as tray locating or spacing guides.

The plate 21 by conventional punching, shearing and forming operations is fabricated with required apertures and with upward flanges for rigidity and mounting purposes, namely, the aforementioned front flange 21f, side flanges 21s and a rear flange 21r. The plate 21 aptly serves as a sub-assembly chassis carrying the heating unit H secured thereto by screws through the plate and gasket 22 into the casting, the switches and lamps secured in the front flange 21f, the power cord PS anchored in the plate itself and the wiring in place within the support plate flanges and already connected to the lamps, switches, power cord, heater element and its associated thermally responsive elements. After the hood shell 41 is mounted on the column, and preferably the feet and the warmer plate and bracket assembled in the base, the warmer plate leads are connected and the plate 21 is merely slid into the open hood back to bring the switch levers or actuating elements through the respective hood front panel openings. The plate then being supported against upward displacement by engagement along the top edge of flange 21f with a transverse flange of the shell front panel 41a, and at the back portion through bonded spacer strips 40 on column top 58, it is finally simply secured by screw 59 passed through the plate 21, the spacers, and the shell flanges 41f and the flanges 58 and nuts beneath the latter.

Thereafter the tray T, with gasket 24 cemented in place to its bottom, is inserted, and the back cover R is applied and secured to plate rear flange 21r by a plurality of sheet metal screws 60. The V-shaped opening in the back through which the power cord is taken also affords a convenient cord storage opening.

It should be observed that the shoulders arising by the shell bottom flanges 41f projecting outwardly beyond the flanges 58 afford a convenient grip or finger hold for handling the machine from above.

OPERATION

By way of example, there may be considered a coffee brewing machine having structure similar to that represented in the drawings, a cast aluminum unit with a mass of about 1 pound 2 ounces, a resistance wattage rating of 1500 watts, operating on a nominal 118 volt A.C. supply, and an 8 cup (48 ounces) rated capacity with a tray 2-inch deep having an added central eleven thirty-seconds depression to orifice 30.

The delivery cycle time to empty the tray was a nominal 5 minutes, with a 0.202 inch cylindrical orifice about 0.011 inches long above a 58° conical or beveled seat through a 0.035 inch thick tray wall, a diameter of 0.113 inch of an orifice 33c in a one-sixteenth inch thick disk 33d carried through a plug extension 33g about 0.14 inch long, with about 0.005 inch radial clearance to the orifice. The notches 33v as projected upon a diametric plane through the bail legs had a V-shape with 0.032 inch radius bottom tangent to the disk top and a projected span about equal to the plug orifice diameter at 0.09 inches above the notch bottom.

The "free float", hence flow area increase, in the valving system was set to begin after the discharge of about four cups from the tray, with thereafter increased flow despite the decreasing water level or head. Thus in effect there was programming of the flow to the heater unit to begin increasing at a point in the cycle when there has already been some heating of the water in the tray itself by principally a heat recovering condensation of vapor generated in the heating unit, and other transfer such as through air within the hood heated by the block, and further at a time when, with decreasing residual water in the tray, such modes of heat transfer result in an increasing time rate of temperature elevation for the water fed to the unit H.

In about a half-minute after the heating unit H was turned on, the block was at the cycle starting temperature as indicated by the lamp IL, whereupon the water was poured into the tray. With the water poured in at 52F, the variable orifice above detailed provided an actual reservoir delivery time of 4 minutes 37 seconds; and with an actual effective heater power of about 1490 watts, a thermostat set for 215° F., a final coffee temperature of 180° F. was obtained in a beaker B resting on a 70 watt plate turned on throughout the delivery. The described disposition of the thermostat achieved a heater turn-on in about 5 seconds of the water pour-in.

I claim:

1. A pour-in, instant heating electrically powered water heating apparatus comprising:
   - an electrical resistance heated type water heating unit providing therein, from a water inlet point to a discharge region, a water heating gravity flow path;
   - a pour-in fill water reservoir having an outlet through which water is gravitationally fed to said heater inlet point;
   - and means controlling flow from said reservoir to the heating unit inlet providing during a first part of the reservoir discharge cycle one outlet flow area, and thereafter increased outlet flow area to utilize more fully through the cycle the heating capacity of the said unit, and
   - thereby minimize the heating unit resistance wattage required to obtain a desired water discharge temperature in a selected cycle time and conversely to minimize the cycle time required to obtain a desired water discharge temperature with a unit of a given wattage.

2. Apparatus as described in claim 1, with said means comprising:
a valving element sealable in the outlet opening of said reservoir and having therethrough a reservoir discharge controlling orifice, and
a device responsive to water level in the reservoir to shift said element, from a sealed relation with said opening prevailing during a first part of the discharge cycle, to afford thereafter in the cycle a larger flow area.

3. Apparatus as described in claim 2, wherein said valving element has therein a flow-passage-defining formation providing a flow area increasing at an increasing rate with element displacement.

4. Apparatus as described in claim 2, wherein said outlet is a bottom-beveled aperture through a reservoir bottom wall; and
said valving element includes a tapered hollow plug seatable upwardly against the aperture bevel and a tubular extension through the aperture, said extension connected to a float within the reservoir as the responsive device;
said discharge controlling orifice continued through said extension;
said extension having an axially extending notch running down to the tapered portion of the plug to provide increased flow area as the notch passes downward through the outlet opening.

5. Apparatus as described in claim 2, wherein said unit includes a comparatively thin cast metal block having therein an upwardly open elongated shallow cavity providing a flow path from an inlet region to the discharge region, comprising at one block end a circular well with an array of concentric interrupted circular ribs on the internal bottom surface thereof and a plurality of peripherally located and spaced discharge openings, a centrally apertured, downwardly dished circular baffle in said well in close vertical spacing to said array with periphery in good thermal contact with the well wall, a flow channel sloping from the other block end as the inlet region downward to the well edge to direct water onto said circular baffle,
and a centrally depressed cover baffle spaced above and covering the well and channel and having a central opening longitudinally offset to said inlet region, said cover baffle having a continuous coplanar margin in good thermal contact with said block along the periphery of and above said well and channel;
and wherein said reservoir has a metal bottom gasketed to the block around and forming heat transfer closure wall above said cover baffle of said cavity for condensation of steam arising in the cavity;
said outlet of the reservoir discharging to the inlet region of the block.

6. Apparatus as described in claim 5, wherein said unit includes a resistance heating element incorporated within and in good thermal contact with surrounding metal of said block;
said element extending parallel and proximate to both sides of said channel and around said well.

7. Apparatus as described in claim 6, wherein said block has in the region beneath said channel, a downwardly open recess;
and wherein a thermostat switch for controlling energization of said heating element is mounted in said recess in good thermal contact with the bottom of the channel proximate to said inlet region.

8. Apparatus as described in claim 1, wherein said unit includes a comparatively thin metal block having therein an upwardly open broad shallow cavity providing a flow path from an inlet point to the discharge region;
said reservoir has a metal bottom gasketed to the block around and forming a closure for said cavity for condensation of steam arising in the cavity;
said outlet of the reservoir discharging to the inlet of the block.

9. Apparatus as described in claim 8, wherein said cavity comprises a shallow, bottom ribbed circular well formation and a peripherally located discharge opening, and a flow channel sloping from the inlet region to the well edge;
said apparatus including
a centrally apertured, dished circular baffle in said well receiving water from said channel, and
a cover baffle centrally depressed covering the well and channel and having a central opening longitudinally offset to said inlet.

10. Apparatus as described in claim 9, wherein said unit includes a resistance heating element incorporated within and in good thermal contact with surrounding metal of said block;
said element extending parallel and proximate to both sides of said channel and around said well.

11. Apparatus as described in claim 8, having a housing structure including
a pedestal providing a horizontally extending base providing stable engagement with a supporting environmental horizontal surface and a vertically extended hollow back column structure integral with and rising from the base,
and a separate hollow hood structure for enclosing said heating unit and reservoir, having a rear bottom portion engaged and secured on a column top end and a front portion extending forwardly over the front portion of the base, the hood front portion on its bottom provided with a brewing funnel support formation;
said base having a recessed bottom and having a beaker warmer plate aperture at the front region thereof opening downwardly to said recess;
said warmer plate supported in said base at the respective base aperture;
said heater unit supported on a bottom wall of the hood structure with the unit discharge region disposed in the forward portion of the hood for discharge into a brewing funnel aligned in said support formations over said warmer plate;
said reservoir a broad shallow metal tray supported above said heating unit to be filled by water poured into a filling opening through the top of said hood.

12. Apparatus as described in claim 11, wherein said hood structure comprises a downwardly and rearwardly open casing including
   a front panel having apertures for manual control switches and for indicator lamps, and integral longitudinal lateral inward bottom flanges at the rear secured to respective flat top end areas of the column and, in said support formation, affording opposed spaced ledges to engage a lip of a brewing funnel inserted from the front, and
a support plate forming a bottom wall for the casing and upon said bottom flanges and with said ledges defining opposed funnel lip engaging slots.

13. Apparatus as described in claim 12, wherein
said support plate includes an upward flange supporting manual control switches and indicator lamps in operative alignment with respective said apertures of the front panel,
said heating unit being secured on said support plate and having mounted thereon water heat thermoswitch control means;
said support plate with said heating unit, control switches and lamps mounted thereon and a power cord anchored thereto being insertable as a wired sub-assembly into the open back of the said casing;
said reservoir insertable through the said open back into the casing and supported on the heating unit.

14. Apparatus as described in claim 13, wherein
a molded insulating T-section member secured in the back of the hood structure provides a back closure for said casing and an inward flange affording a safety shield over conductive elements of an energizing circuit for the heating unit.

15. Apparatus as described in claim 14, wherein
said pedestal and casing are constituted by respective molded plastic members, and said support plate is a formed sheet metal member.

16. Apparatus as described in claim 1, wherein:
the reservoir outlet is provided by two reservoir bottom wall apertures;
one said aperture being a fixed aperture unvaried through the cycle,
the second of said apertures provided with a shiftable valve member, and
means for shifting said member to increase the effective flow area and including a bimetal member sensing temperature of the heating unit in the region of the water inlet to increase the flow area in a later portion of the cycle.

17. Apparatus as described in claim 1, wherein:
the reservoir outlet includes a reservoir bottom wall aperture and a shiftable valving member for said aperture varying the effective flow area of said outlet by shift of said valving member;
said apparatus including means for shifting said member to increase the effective flow area and including a bimetal member carrying the valving member and sensing temperature of the region of the water flow path to increase the flow area with increased temperature in said region.

18. A pour-in type electrically powered coffee-brewing apparatus comprising:
   an electrically heated type water heating unit having a water inlet and a water discharge;
   a pour-in filled water reservoir tray having an outlet through which water is gravitationally fed to said heater water inlet; and
a housing structure including
   a pedestal providing a horizontally extending base providing stable engagement with a supporting environmental horizontal surface and a vertically extended hollow back column structure integral with and rising from the base,
   and a separate hollow hood structure for enclosing said heating unit and reservoir, having a rear bottom portion engaged and secured on the column top end and a front portion extending forwardly over the front portion of the base, the hood front portion on its bottom provided with brewing a funnel support formation, said base having a recessed bottom and having a beaker warmer plate aperture at the front region thereof opening downwardly to said recess,
   said warmer plate bracket supported within said base at the respective base aperture;
   discharge means for hot water delivered from said heater unit supported in a bottom wall of the hood structure for discharge into a brewing funnel aligned in said support formation over said warmer plate;
   said reservoir a broad shallow metal tray supported in said hood to be filled by water poured into a filling opening through the hood top.

19. Apparatus as described in claim 18, wherein
said hood structure comprises
a downwardly and rearwardly open casing including
   a front panel having apertures for manual control switches and for indicator lamps, and integral longitudinal lateral bottom inward flanges at the rear secured to respective flat top end areas of the column and in said support formation affording opposed spaced ledges to engage a lip of a brewing funnel inserted from the front; and
a support plate forming a bottom wall for the casing and supported upon said bottom flanges and with said ledges defining opposed funnel lip engaging slots.

20. Apparatus as described in claim 19, wherein
said support plate includes an upward flange supporting manual control switches and indicator lamps in operative alignment with respective said apertures of the front panel,
said heating unit being secured within a hollow portion of said housing having mounted therewith water heat thermoswitch control means;
said support plate with said control switches, lamps and connecting wiring mounted thereon and a power cord anchored thereto being insertable as a wired sub-assembly into the open back of the said casing;
said reservoir insertable through the said open back into the casing for support therein above said sub-assembly.

21. Apparatus as described in claim 20, wherein
a molded T-section member secured in the back of the hood structure provides a back closure for said casing,
said pedestal and casing are constituted by respective molded plastic members, and
said support plate is a formed sheet metal member.

* * * * *

UNITED STATES PATENT OFFICE
CERTIFICATE OF CORRECTION

Patent No. 3,693,535　　　　　　　Dated September 26, 1972

Inventor(s)　Edmund A. Abel, Jr.

It is certified that error appears in the above-identified patent and that said Letters Patent are hereby corrected as shown below:

Cancel claims 5, 6, 7, 9, 10 and 17.

Claim 16, column 11, lines 44-46, delete "and including a bimetal member sensing temperature of the heating unit in the region of the water inlet to increase the flow area".

Claim 18, column 12, line 13, change "brewing a" to read -- a brewing --; line 25, after "reservoir" insert -- being --.

Signed and sealed this 1st day of May 1973.

(SEAL)
Attest:

EDWARD M. FLETCHER, JR.　　　ROBERT GOTTSCHALK
Attesting Officer　　　　　　　Commissioner of Patents